(12) United States Patent
Whiteker et al.

(10) Patent No.: US 6,333,389 B2
(45) Date of Patent: *Dec. 25, 2001

(54) OLEFIN POLYMERIZATION CATALYSTS, THEIR PRODUCTION AND USE

(75) Inventors: Gregory T. Whiteker; Jack A. Smith, both of Charleston, WV (US)

(73) Assignee: Univation Technologies, LLC, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/248,147

(22) Filed: Feb. 10, 1999

Related U.S. Application Data

(63) Continuation-in-part of application No. 09/216,594, filed on Dec. 18, 1998.

(51) Int. Cl.$^7$ ........................................ C08F 4/42
(52) U.S. Cl. ............. 526/161; 526/172; 526/348; 526/111; 526/135; 502/155; 502/117; 502/158; 502/162; 502/156
(58) Field of Search .................. 526/161, 172, 526/348, 111, 135; 502/155, 117, 158, 162, 156

(56) References Cited

U.S. PATENT DOCUMENTS

| | | | | |
|---|---|---|---|---|
| 5,030,606 | * | 7/1991 | Klabunde | 502/155 |
| 5,637,660 | * | 6/1997 | Nagy et al. | 526/160 |

FOREIGN PATENT DOCUMENTS

| | | |
|---|---|---|
| 0 798 313 A1 | 10/1997 | (EP). |
| 0 874 005 A1 | 10/1998 | (EP). |
| 0 950 667 A2 | 10/1999 | (EP). |
| 11-80228 | * 3/1999 | (JP). |
| 11-100394 | * 4/1999 | (JP). |

OTHER PUBLICATIONS

Milani, Inorganica Chimica Acta, 103, pp 15–18, 1985.*
Bei et al. Organometallics, 16, pp. 3282–3302, 1997.*
Coleman, W. M., III: "Ligand field effects on kinetic profiles in ethylene, alpha–olefin copolymerization", Appl. Catal. (1986), 22(2), 345–69, XP002134858 abstract p. 357, paragraph 2; table 3.

Chemical Abstracts, vol. 131, No. 8, Aug. 23, 1999, Columbus, Ohio, US; abstract No. 102661, Matsui, Shigekazu et al: "Transition metal compounds useful as olefin polymerization catalysts and polymerization method therewith" XP002135170 abstract & JP 11 199592A (Mitsui Chemicals Inc., Japan) Jul. 27, 1999.

* cited by examiner

*Primary Examiner*—David W. Wu
*Assistant Examiner*—Ling-Siu Choi
(74) *Attorney, Agent, or Firm*—Catherine L. Bell; Jaimes Sher; Lisa Kimes Jones

(57) ABSTRACT

This invention relates to a catalyst system comprising an activator and one or more heteroatom substituted phenoxide group 3 to 10 transition metal or lanthanide metal compounds wherein the metal is bound to the oxygen of the phenoxide group and provided that:

a) if more than one heteroatom substituted phenoxide is present it is not bridged to the other heteroatom substituted phenoxide, b) if the metal is a group 4 metal then the carbon adjacent to the carbon bound to the oxygen of the phenoxide may not be bound to an aldehyde or an ester, c) the carbon ortho to the carbon bound to the oxygen of the phenoxide may not be bound to the $C^1$ carbon in a group represented by the formula:

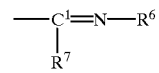

wherein $R^6$ and $R^7$ are independently hydrogen, halogen, a hydrocarbon group, a heterocyclic compound residue, an oxygen containing group, a nitrogen containing group, a boron containing group, an sulfur containing group, a phosphorus containing group, a silicon containing group, a germanium containing group, or a tin containing group, and $R^1$ and $R^2$ may be bonded to each other to form a ring. The activator may be an aluminum alkyl, an alumoxane, a modified alumoxane, a non-coordinating anion, a borane, a borate or a mixture thereof.

18 Claims, No Drawings

OLEFIN POLYMERIZATION CATALYSTS, THEIR PRODUCTION AND USE

STATEMENT OF RELATED APPLICATIONS

This application is a continuation in part of U.S. Ser. No. 09/216,594, filed Dec. 18, 1998 and claims priority therefrom.

FIELD OF THE INVENTION

This invention relates to a new family of olefin polymerization catalysts based upon phenoxide complexes of transition metals.

BACKGROUND OF THE INVENTION

The intense commercialization of metallocene polyolefin catalysts (metallocene being cyclopentadienyl based transition metal catalyst compounds) has led to widespread interest in the design of non-metallocene, homogeneous catalysts. This field is more than an academic curiosity as new, non-metallocene catalysts may provide an easier pathway to currently available products and may also provide product and process opportunities which are beyond the capability of metallocene catalysts. In addition, certain non-cyclopentadienyl ligands will be more economical due to the relative ease of synthesis of a variety of substituted analogs.

Anionic, multidentate heteroatom ligands have received the most attention in non-metallocene polyolefins catalysis. Notable classes of bidentate anionic ligands which form active polymerization catalysts include N—N$^-$ and N—O$^-$ ligand sets. Examples of these types of non-metallocene catalysts include amidopyridines (Kempe, R., "Aminopyridinato Ligands—New Directions and Limitations", 80$^{th}$ Canadian Society for Chemistry Meeting, Windsor, Ontario, Canada, Jun. 1–4, 1997. Kempe, R. et al, *Inorg. Chem.* 1996 vol 35 6742.) Likewise, recent reports by Jordan et al. of polyolefin catalysts based on hydroxyquinolines (Bei, X.; Swenson, D. C.; Jordan, R. F., *Organometallics* 1997, 16, 3282) have been interesting even though the catalytic activities of Jordan's hydroxyquinoline catalysts is low.

European Patent Application 0 803 520 discloses polymerization catalysts containing beta-diketiminate ligands. Other recent non-metallocene olefin polymerization catalysts include U.S. Pat. No. 4,057,565 which discloses 2-dialkylaminobenzyl and 2-dialkylaminomethylphenyl derivatives of selected transition metals and WO 96/08498 which discloses group 4 metal complexes containing a bridged non-aromatic, anionic dienyl ligand group.

U.S. Pat. No. 5,637,660 discloses bidentate pyridine based transition metal catalysts.

Further Grubbs et al in Organometallics, Vol 17, 1988 page 3149–3151 disclose that nickel (II) salicylaldiminato complexes combined with B(C$_6$F$_5$)$_3$ polymerized ethylene. (49,500 Mw, Mw/Mn 6.8, and 35 branches per 1000 C's).

Ethylenebis(salicylideneiminato)zirconium dichloride combined with methyl alumoxane deposited on a support and unsupported versions were used to polymerize ethylene by Repo et al in Macromolecules 1997, 30, 171–175.

Further EP 241,560 A1 discloses alkoxide ligands in transition metal catalyst systems.

EP 0 874 005 A1 discloses phenoxide compounds with an imine substituent for use as a polymerization catalyst.

Thus there is a need in the art for new novel olefin polymerization catalysts.

SUMMARY OF THE INVENTION

This invention relates to a catalyst system comprising an activator and one or more heteroatom substituted phenoxide group 3 to 10 or lanthanide transition metal compounds wherein the metal is bound to the oxygen of the phenoxide group and provided that:

a) if more than one heteroatom substituted phenoxide is present it is not bridged to the other heteroatom substituted phenoxide, b) if the metal is a group 4 metal then the carbon ortho to the carbon bound to the oxygen of the phenoxide may not be bound to an aldehyde or an ester, and c) the carbon ortho to the carbon bound to the oxygen of the phenoxide may not be bound to the C$^1$ carbon in a group represented by the formula:

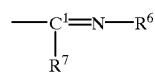

wherein R$^6$ and R$^7$ are independently hydrogen, halogen, a hydrocarbon group, a heterocyclic compound residue, an oxygen containing group, a nitrogen containing group, a boron containing group, an sulfur containing group, a phosphorus containing group, a silicon containing group, a germanium containing group, or a tin containing group. The activator is preferably one or more of aluminum alkyl, an alumoxane, a modified alumoxane, a non-coordinating anion, or a borane.

This invention further relates to a novel olefin polymerization systems comprising an activator and one or more catalysts represented by the of the following formulae:

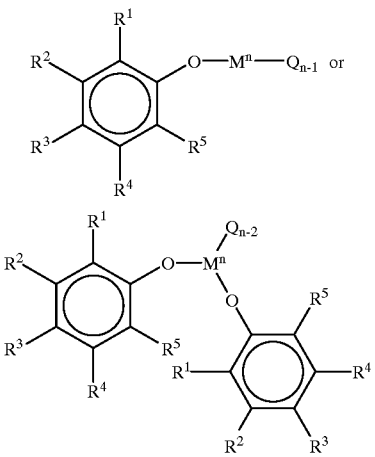

wherein R$^1$ to R$^5$ may be independently hydrogen, a heteroatom containing group or a C$_1$ to C$_{100}$ group provided that one of R$^2$ to R$^5$ is a group containing a heteroatom (R$^5$ and/or R$^1$ also may or may not be bound to the metal M), and further provided that the R$^4$ and R$^5$ groups do not form pyridine in the first formula if M is a group 4 metal and the R$^4$ and R$^5$ groups do not form pyridine in at least one ring of the second formula if M is a group 4 metal, O is oxygen, M is a group 3 to 10 transition metal or lanthanide metal, n is the valence state of M, Q is an anionic ligand or a bond to an R group containing a heteroatom which may be any of R$^1$ to R$^5$, and further provided that if M is a group 4 metal then R$^5$ may not be an aldehyde or an ester, and further provided that if M is nickel then R$^5$ may not be an imine. Any two or more R groups may form a ring structure. Provided however that neither R$^1$ nor R$^5$ may be a group represented by the formula

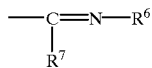

wherein $R^6$ and $R^7$ are independently hydrogen, halogen, a hydrocarbon group, a heterocyclic compound residue, an oxygen containing group, a nitrogen containing group, a boron containing group, an sulfur containing group, a phosphorus containing group, a silicon containing group, a germanium containing group, or a tin containing group, and $R^6$ and $R^7$ may be bonded to each other to form a ring. The activator is preferably an aluminum alkyl, an alumoxane, a modified alumoxane, a non-coordinating anion, a borane or a combination thereof.

DETAILED DESCRIPTION OF THE INVENTION

This invention relates to a novel olefin polymerization system comprising an activator and one or more catalysts represented by the following formulae:

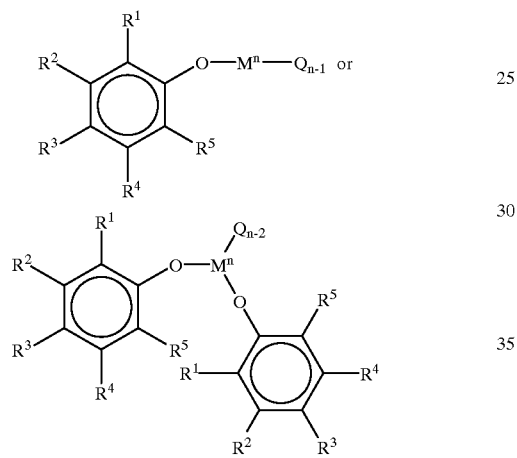

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, provided that in the first formula if M is a group 4 metal then the $R^4$ and $R^5$ groups do not form pyridine and in the second formula if M is a group 4 metal the $R^4$ and $R^5$ groups do not form pyridine in at least one ring, and further provided that if M is a group 4 metal then $R^5$ may not be an aldehyde or an ester, and further provided that if M is nickel then $R^5$ may not be an imine, further provided that neither $R^1$ nor $R^5$ may be a group represented by the formula

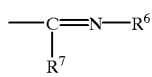

wherein $R^6$ and $R^7$ are independently hydrogen, halogen, a hydrocarbon group, a heterocyclic compound residue, an oxygen containing group, a nitrogen containing group, a boron containing group, an sulfur containing group, a phosphorus containing group, a silicon containing group, a germanium containing group, or a tin containing group, and $R^6$ and $R^7$ may be bonded to each other to form a ring;

O is oxygen, M is a group 3 to group 10 transition metal or lanthanide metal, preferably a group 4 metal, preferably Ti, Zr or Hf. n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$. A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

Preferred catalyst systems of this invention include those comprising catalysts represented by the following formulae:

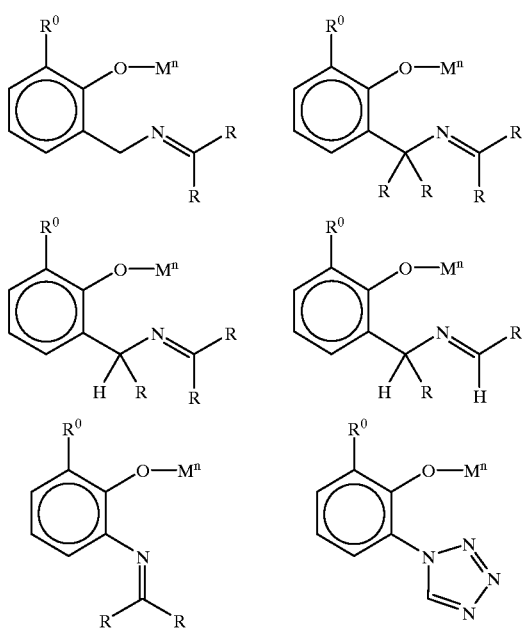

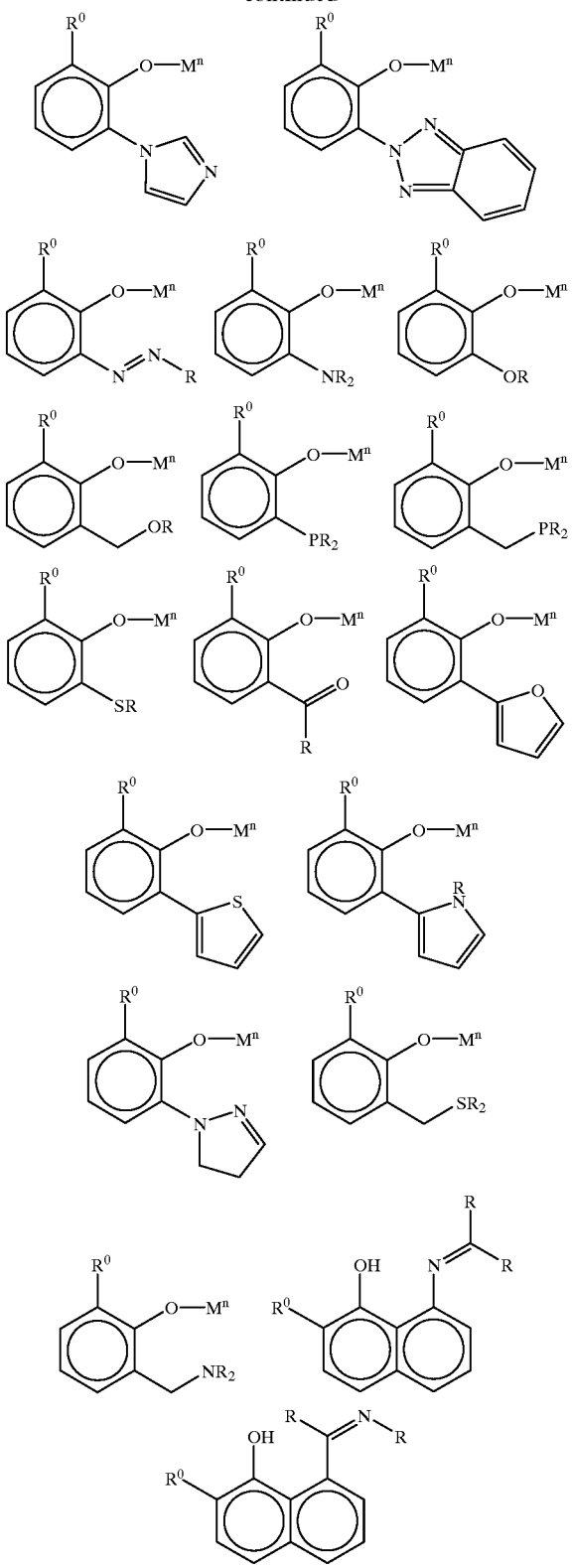

wherein
R⁵=aldimino, ketimino, alkoxy, α-alkoxymethyl, thioalkoxy, α-thioalkoxymethyl, amino, α-aminomethyl, azo, phosphino, α-phosphinomethyl, keto or cyclic substituents such as pyrrole, furan, thiophene, imidazole, pyrazole, tetrazole, oxazoline, isoazole, thiazole. R⁰=preferably tertiary alkyl or silyl group, such as —CMe₃, —CMe₂Et, CEt₃, —CMe₂Ph, —CPh₃, —SiEt₃, —SiPh₃. R=is hydrogen or an alkyl, aryl, silyl group or —OT where O is oxygen and T is hydrogen or an alkyl, aryl or silyl group. M$^n$ is a group 3 to 10 transition metal or a lanthanide metal, preferably a group 4 metal, n is the valence of M and M$^n$ is also bound to $Q_{n-1}$, where Q is as defined above or any of the phenoxide groups in the above formulae.

The synthesis of desired ligands can be accomplished using techniques described in the literature. For example, N-benzylidene-2-hydroxybenzylamines can be prepared by condensation of an aldehyde or ketone with the prequisite 2-hydroxybenzylamine. In some instances, such as those involving less-reactive amines or aldehydes, addition of a catalytic amount of formic acid or 3 Å molecular sieves may be required. Phenols with heterocyclic substituents can also be prepared by standard techniques. For example, ortho-cyanophenols can be converted to oxazolines via reaction with α-aminoalcohols. Certain ligands, such as ortho-benzotriazole-substituted phenols are commercially available.

Metallation of these acidic functionalized phenols can be accomplished by reaction with basic reagents such as $Zr(CH_2Ph)_4$, $Ti(NMe_2)_4$. Reaction of phenolic ligands with $Zr(CH_2Ph)_4$ occurs with elimination of toluene, whereas reaction with $Ti(NMe_2)_4$ proceeds via amine elimination. In both cases simple alkoxide complexes are formed, as determined by $^1$H NMR spectroscopy. Alternatively, ligands can be deprotonated with reagents such as BuLi, KH or Na metal and then reacted with metal halides, such as $ZrCl_4$ or $TiCl_4$.

Preferred transition metal compounds for use in this invention include:

bis(N-benzylidene-2-hydroxy-3,5-di-t-butylbenzylamine) zirconium(IV) dibenzyl;
bis(N-benzylidene-2-hydroxy-3,5-di-t-butylbenzylamine) zirconium(IV) dichloride;
bis(2-(2H-benzotriazol-2-yl)-4,6-di-t-amylphenoxide) zirconium(IV) dibenzyl;
bis(N-benzylidene-2-hydroxy-3,5-di-t-butylbenzylamine) titanium(IV) dibenzyl;
bis(2-(2H-benzotriazol-2-yl)-4,6-di-t-amylphenoxide) zirconium(IV) dibenzyl;
bis(2-(2H-benzotriazol-2-yl)-4,6-di-t-amylphenoxide) zirconium(IV) dichloride;
bis(2-(2H-benzotriazol-2-yl)-4,6-di-t-amylphenoxide) zirconium(IV) di(bis(dimethylamide));
bis(2-(2H-benzotriazol-2-yl)-4,6-di-(1',1'-dimethylbenzyl) phenoxide)zirconium(IV) dibenzyl;
bis(2-(2H-benzotriazol-2-yl)-4,6-di-t-amylphenoxide) titanium(IV) dibenzyl;
bis(2-(2H-benzotriazol-2-yl)4,6-di-(1',1'-dimethylbenzyl) phenoxide)titanium(IV) dibenzyl;
bis(2-(2H-benzotriazol-2-yl)4,6-di-(1',1'-dimethylbenzyl) phenoxide)titanium(IV) dichloride; and
bis(2-(2H-benzotriazol-2-yl)4,6-di-(1',1'-dimethylbenzyl) phenoxide)hafnium(IV) dibenzyl.

In a preferred embodiment one or more of the transition metal compounds named above is combined with an aluminum alkyl, an alumoxane, a modified alumoxane, a non-coordinating anion, a borane, a borate or a mixture thereof The catalysts described herein are preferably combined with an activator to form an olefin polymerization catalyst system. Preferred activators include alkyl aluminum compounds (such as diethylaluminum chloride), alumoxanes, modified alumoxanes, non-coordinating anions, boranes and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Boranes appear to perform better than borates, however this may be an experimental artifact and should not be construed as limiting this invention. Other useful compounds include triphenyl boron, triethyl boron, tri-n-butyl ammonium tetraethylborate, tri-aryl borane and the like.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, now abandoned all of which are herein fully incorporated by reference. Other activators include those described in PCT publication WO 98/07515 such as tris (2,2',2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

In general the transition metal compound and the activator are combined in ratios of about 1000:1 to about 0.5:1. In a preferred embodiment the transition metal compound and the activator are combined in a ratio of about 300:1 to about 1:1, preferably about 10:1 to about 1:1, for boranes the ratio is preferably about 1:1 to about 10:1 and for alkyl aluminum compounds (such as diethylaluminum chloride combined with water) the ratio is preferably about 0.5:1 to about 10:1.

In one embodiment the catalysts systems described above can further include other classes of catalysts, such as for example one or more Ziegler-Natta catalysts and/or one or more metallocene catalyst and/or one or more vanadium catalysts and/or one or more chromium catalysts. In a preferred embodiment a Ziegler-Natta catalyst as described in *Ziegler-Natta Catalysts and Polymerizations*. John Boor, Academic Press, New York, 1979 (with or without a separate activator) is combined with a catalyst system of this invention and used to polymerize one or more olefins. In another embodiment a metallocene catalyst (such as a cyclopentadienyl transition metal compound) with or without a separate activator is combined with a catalyst system of this invention and used to polymerize one or more olefins. Preferred cyclopentadienyl transition metal compounds are those mono-and bis-cyclopentadienyl group 4, 5 and 6 compounds described in U.S. Pat. Nos. 4,530,914, 4,805,561, 4,937,299, 5,124,418, 5,017,714, 5,057,475, 5,064,802, 5,278,264, 5,278,119, 5,304,614, 5,324,800, 5,347,025, 5,350,723, 5,391,790 5,391,789, EP-A-0 591 756, EP-A-0 520 732, EP-A-0 578,838, EP-A-0 638,595, EP-A-0 420 436, WO 91/04257, WO 92/00333, WO 93/08221, WO 93/08199, WO 94/01471, WO 94/07928, WO 94/03506 and WO 95/07140, all of which are fully incorporated by reference herein.

The catalysts and catalyst systems described above can be used in any known olefin polymerization process including gas phase, solution, slurry and high pressure. The catalysts and catalyst systems described above are particularly suitable for use a solution, gas or slurry polymerization process or a combination thereof, most preferably a gas or slurry phase polymerization process.

In one embodiment, this invention is directed toward the solution, slurry or gas phase polymerization reactions involving the polymerization of one or more of monomers having from 2 to 30 carbon atoms, preferably 2–12 carbon atoms, and more preferably 2 to 8 carbon atoms. Preferred monomers include one or more of ethylene, propylene, butene-1, pentene-1,4-methyl-pentene-1,3,5,5-trimethyl-hexene-1, hexene-1, octene-1, decene-1,3-methyl-pentene-1, and cyclic olefins or a combination thereof. Other monomers can include vinyl monomers, diolefins such as dienes, polyenes, norbornene, norbornadiene monomers. In one embodiment, a homopolymer of ethylene is produced.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The productivity of the catalyst or catalyst system in a gas phase system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts are tumbled with up to 6 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. These agents may be dry tumbled with the catalyst or may be fed into the reactor in a solution with or without the catalyst system or its components.

The catalyst and/or the activator may be placed on a support. Typically the support can be of any of the solid, porous supports. Typical support materials include talc; inorganic oxides such as silica, magnesium chloride, alumina, silica-alumina; polymeric supports such as polyethylene, polypropylene, polystyrene; and the like. Preferably the support is used in finely divided form. Prior to use the support is preferably partially or completely dehydrated. The dehydration may be done physically by calcining or by chemically converting all or part of the active hydroxyls. For more information on how to support catalysts please see U.S. Pat. No. 4,808,561 which teaches how to support a metallocene catalyst system. The techniques used therein are generally applicable for this invention.

The catalyst system, the catalyst and or the activator may also be introduced into the reactor in solution. In one embodiment a solution of the activated catalyst in an alkane such as pentane, hexane, isopentane or the like is feed into a gas phase reactor.

In a preferred embodiment, the polyolefin recovered typically has a melt index as measured by ASTM D-1238, Condition E, at 190° C. of 100 g/10 min or less. In a preferred embodiment the polyolefin is ethylene homopolymer.

In a preferred embodiment the catalyst system described above is used to make a polyethylene having a density of between 0.89 and 0.960 g/cm³ (as measured by ASTM 2839), a melt index of 1.0 or less g/10 min or less (as measured by ASTM D-1238, Condition E, at 190° C.). Polyethylene having a melt index of between 0.01 to 10 dg/min is preferably produced. In some embodiments, a density of 0.915 to 0.940 g/cm³ would be preferred, in other embodiments densities of 0.930 to 0.960 g/cm³ are preferred.

The polyolefins then can be made into films, molded articles, sheets and the like. The films may be formed by any of the conventional technique known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, BaSO$_4$, diatomaceous earth, wax, carbon black, flame retarding additives, low molecular weight resins, hydrocarbon resins, glass beads and the like.

The additives may be present in the typically effective amounts well known in the art, such as 0.001 weight % to 10 weight %.

This invention further relates to a library of a plurality of heteroatom substituted phenoxide group 3 to 10 transition metal or lanthanide metal compounds wherein the metal is bound to the oxygen of the phenoxide group and provided that:
a) if more than one heteroatom substituted phenoxide is present it is not bridged to the other heteroatom substituted phenoxide,
b) if the metal is a group 4 metal then the carbon ortho to the carbon bound to the oxygen of the phenoxide may not be bound to an aldehyde or an ester, and
c) the carbon ortho to the carbon bound to the oxygen of the phenoxide may not be bound to the C¹ carbon in a group represented by the formula:

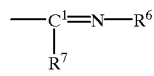

wherein R⁶ and R⁷ are independently hydrogen, halogen, a hydrocarbon group, a heterocyclic compound residue, an oxygen containing group, a nitrogen containing group, a boron containing group, an sulfur containing group, a phosphorus containing group, a silicon containing group, a germanium containing group, or a tin containing group.

In a preferred embodiment the heteroatom substituted phenoxide group 4 to 10 transition metal or lanthanide metal compounds are represented by the formulae above. These libraries may then be used for the simultaneous parallel screening of catalysts, activators and or monomers by combining the library with one or more activators and or olefins.

EXAMPLES

MMAO is modified methylalumoxane (type 3 in hexane) commercially available from Akzo Chemicals, Inc. under the trade name Modified Methylalumoxane type 3A, covered under U.S. Pat. No. 5,041,584)

Example 1

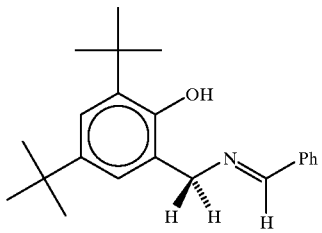

Synthesis of N-benzylidene-2-hydroxy-3,5,di-t-butylbenzylamine. A solution of 2-hydroxy-3,5,di-t-butylbenzylamine (prepared by the procedure described by G. E. Stokker, et al.; *J. Med. Chem.* 1980, 23, 1414; 2.35 g, 10.0 mmol) is prepared in 50 mL methanol. Benzaldehyde (1.06 g, 10.0 mmol) is added, and the resulting solution is stirred for 30 minutes. Product crystallizes upon cooling the solution to −40° C.

Example 2

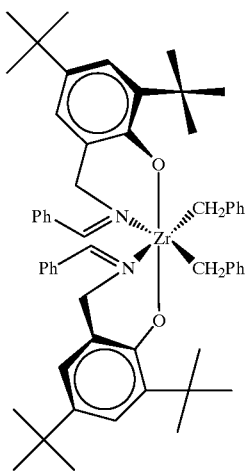

Ethylene polymerization using catalyst 1. A solution of N-benzylidene-2-hydroxy-3,5,di-t-butylbenzylamine is prepared in 50 ML toluene. Bz$_4$Zr is added (0.5 equiv), and the resulting solution is stirred for 30 minutes. A 1 µmol aliquot of the solution is withdrawn and added to 300 equiv of MMAO (Type 3A, Akzo). The resulting solution is stirred for 5 minutes and is injected into a 1 L slurry reactor, containing 600 mL hexane, 43 mL hexene and 100 µmol isoBu$_3$Al. The reactor is then pressurized to 85 psi (586 kPa) with ethylene and heated to 75° C. After 30 minutes, the reactor is cooled to ambient temperature and vented. Solid polyethylene is obtained.

Example 3

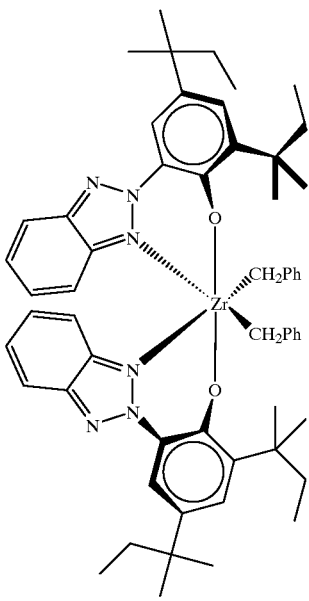

Ethylene polymerization using catalyst 2. A solution of 2-(2H-Benzotriazol-2-yl)-4,6-di-t-pentylphenol (Aldrich) was prepared in 50 mL toluene. $Bz_4Zr$ was added (0.5 equiv), and the resulting solution was stirred for 30 minutes. The resulting solution wa added to 300 equiv of MMAO (Type 3A, Akzo). The resulting solution was stirred for 5 minutes, a 0.25 $\mu$mol (Zr) aliquot of the solution was withdrawn and injected into a 1 L slurry reactor, containing 600 mL hexane, 43 mL hexene and 100 $\mu$mol isoBu$_3$Al. The reactor was then pressurized to 85 psi (586 kPa) with ethylene and heated to 75° C. After 30 minutes, the reactor was cooled to ambient temperature and vented. Solid polyethylene was obtained (0.98 g) which corresponds to an activity of 9200 g PE/mmol Zr.100 psi $C_2H_4$.hr.

The catalysts described herein are expected to produce HDPE under ethylene-hexene copolymerization conditions.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

We claim:

1. A process for polymerizing olefins comprising combining ones or more olefins with a catalyst system comprising the reaction product of one or more activators selected from alumoxanes, modified alumoxanes or ionizing activators, and one or more heteroatom substituted phenoxide Group 4 to 10 transition metal or lanthanide metal compounds wherein the metal is bound to the oxygen of the phenoxide group and provided that:
    a) if more than one heteroatom substituted phenoxide is present it is not bridged to the other heteroatom substituted phenoxide,
    b) if the metal is a Group 4 metal then the carbon ortho to the carbon bound to the oxygen of the phenoxide is not bound to an aldehyde or an ester,
    c) the carbon ortho to the carbon bound to the oxygen of the phenoxide is not bound to the $C^1$ carbon in a group represented by the formula:

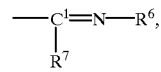

d) if the metal is a Group 4 metal then the ortho and meta carbons do not form a pyridine ring, and
    e) the heteroatom substituted phenoxide group contains one or more heteroatom(s) wherein the heteroatom(s) is selected from the group consisting of boron, aluminum, silicon, nitrogen, phosphorus, arsenic, tin, lead, antimony, oxygen, selenium and tellurium, wherein $R^6$ and $R^7$ are independently hydrogen, halogen, a hydrocarbon group, a heterocyclic compound residue, an oxygen containing group, a nitrogen containing group, a boron containing group, a sulfur containing group, a phosphorus containing group, a silicon containing group, a germanium containing group, or a tin containing group, and $R^6$ and $R^7$ may be bonded to each other to form a ring.

2. The process of claim 1 wherein the heteroatom substituted phenoxide transition metal compound is represented by one of the following formulae:

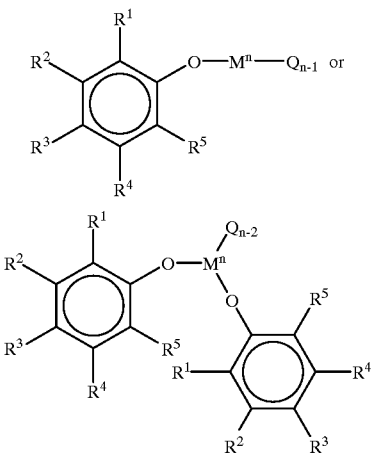

wherein $R^1$ to $R^5$ may be independently hydrogen, a heteroatom containing group or a $C_1$ to $C_{100}$ group provided that at least one of $R^2$ to $R^5$ is a group containing a heteroatom, any of $R^1$ to $R^5$ may or may not be bound to the metal M, O is oxygen, M is a Group 3 to 10 transition metal or a lanthanide metal, N is the valence state of M, Q is an anionic ligand or a bond to an R group containing a heteroatom which may be any of $R^1$ to $R^5$, and provided that:
    a) if M is a Group 4 metal that $R^5$ is not an aldehyde or an ester; and,
    b) the $R^4$ and $R^5$ groups do not form pyridine in the first formula if M is a Group 4 metal; and
    c) neither $R^1$ nor $R^5$ is a group represented by the formula:

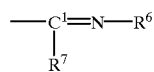

wherein $R^6$ and $R^7$ are independently hydrogen, halogen, a hydrocarbon group, a heterocyclic compound residue, an oxygen containing group, a nitrogen containing group, a boron containing group, a sulfur containing group, a phosphorus containing group, a silicon containing group, a germanium containing group, or a tin containing group.

3. The process of claim 1 wherein the activator is an alumoxane, a modified alumoxane, a borane, a borate, a non-coordinating anion or a mixture thereof.

4. The process of claim 1 wherein Q is a bond to any of $R^1$ to $R^5$ and the R group that Q is bound to is a heteroatom containing group.

5. The process of claim 1 wherein the heteroatom containing group is an imine, triazole, or oxyzole.

6. The process of claim 1 wherein the heteroatom in the heteroatom containing group is nitrogen and/or oxygen.

7. The process of claim 1 wherein the $R^1$ group is a $C_4$ to $C_{20}$ alkyl group.

8. The process of claim 1 wherein the $R^1$ group is a butyl, isobutyl, pentyl hexyl, heptyl, isohexyl, octyl, isooctyl, decyl, nonyl, or dodecyl group.

9. The process of claim 1 wherein two or more R groups have formed a five or six membered ring.

10. The process of claim 1 wherein two or more R groups have formed a multi ring system.

11. The process of claim 1 wherein M is zirconium, titanium or hafnium.

12. The process of claim 1 wherein n is 3 or 4.

13. The process of claim 1 wherein Q is a halogen or an alkyl group.

14. The process of claim 1 wherein Q is an amide, carboxylate, carbamate, thiolate, hydride or alkoxide group.

15. The process of claim 1 wherein the catalyst system and the olefin are reacted in the gas phase.

16. The process of claim 1 wherein the catalyst system and the olefin are reacted in the slurry phase.

17. The process of claim 1 wherein the catalyst system and the olefin are reacted in the slurry phase solution phase.

18. The process of claim 1 wherein the catalyst system and the olefin are reacted under high pressure.

* * * * *